Oct. 6, 1970  A. GODDARD  3,532,394
HYDRAULIC BRAKE SYSTEMS
Filed Feb. 6, 1969  3 Sheets-Sheet 2

United States Patent Office 3,532,394
Patented Oct. 6, 1970

3,532,394
HYDRAULIC BRAKE SYSTEMS
Arthur Goddard, Birmingham, England, assignor to Girling Limited, Tyseley, Birmingham, England
Filed Feb. 6, 1969, Ser. No. 797,002
Claims priority, application Great Britain, Feb. 9, 1968, 6,638/68; Feb. 19, 1968, 7,917/68
Int. Cl. B60t 8/06, 13/12
U.S. Cl. 303—21                    8 Claims

ABSTRACT OF THE DISCLOSURE

The invention relates to servo assisted braking systems for motor vehicles.

According to one aspect, it resides in a braking system in which pressure for one set of slave wheel cylinders is derived from a manually operated master cylinder, operation of which is arranged to actuate a control device to energise a booster for supplying pressure fluid to a second set of wheel cylinders.

Such a system is particularly well suited to adoption as an automatic anti-skid system, by the inclusion of means sensing excessive vehicle deceleration and for producing a power output signal in accordance therewith, this power output signal being applied to the control device in opposition to the actuating signal from the master cylinder.

The invention also includes an improved control device for a vacuum operated booster, the device including valve means controlling energization of the booster, means urging the valve means to a normal position in which the booster is de-energized, hydraulically actuated means responsive to a hydraulic signal pressure (from the master cylinder) to urge the valve means to an operative position in which the booster is energized, and electro-magnetic means to which the said power output is applied and operated to produce a force opposing the force applied to the valve means by the hydraulically actuated means.

This invention relates to hydraulic braking systems for motor vehicles.

There is an increasing tendency in various countries throughout the world for national regulations regarding motor vehicle brakes to require separate sources of hydraulic pressure to be provided for operating the front brakes and the rear brakes, respectively, of a vehicle.

Such systems conventionally include a tandem master cylinder having separate pressure generating chambers. In medium size and large passenger cars it is usual or necessary to provide servo-assistance for the drivers braking effort either by a mechanically actuated servo-motor between the brake pedal and the master cylinder, or by a hydraulically actuated servo-motor in each of the pressure lines to the front and rear brakes. The former involves the consumption of a great deal of space near the bulkhead, where space is at a premium, and the latter requires two servo-motors. Furthermore, such systems do not lend themselves readily for adaption to incorporation of a reasonably cheap but efficient skid control means.

The present invention aims at overcoming these disadvantages, and accordingly provides a hydraulic braking system including a manually actuated master cylinder having a pressure chamber connected directly to a group of front wheel slave cylinders, and means associated with the master cylinder for operating a control device of a servo-motor arranged to generate pressure in an auxiliary cylinder for delivery to a set of rear wheel brake cylinders.

Preferably, the hydraulic line to the rear wheel brakes is connected to a further set of front wheel brake cylinders with the advantage that upon failure of the rear line pressure, due for example to pipe fracture of a failed vacuum source, the front brake can be operated (although less efficiently) under the direct control of the operator. Similarly if the rear line only is operational, both the front (partially) and rear brakes are applied. Another important advantage of this arrangement is that since only a very small hydraulic signal is required to operate the servo-motor, the volumetric discharge of the master cylinder is virtually halved. The bore of the master cylinder can be reduced substantially, so that for a given pedal effort, the pressure generated is much higher and in consequence hydraulic servo-assistance of the front brake line from the master cylinder is no longer required, saving the cost of a booster.

Preferably, the master cylinder is a tandem master cylinder having two separate pressure chambers of which one is connected directly to the first said group of front wheel cylinders and the other is connected to the control device for hydraulic actuation thereof.

Existing tandem master cylinders have a split ratio of approx. 50:50 such that when one line is failed the brake pedal has a free movement of approximately 2 inches before fluid pressure can be generated in the non-failed line. In one way of carrying out the present invention, however, the tandem cylinder has a split ratio of approx. 99:1 and a failure of the line to the servo-motor results in a substantially reduced free movement of the brake pedal, the operator's foot thereby being in a more comfortable position for pressing on the foot pedal.

With little modification and cost the system can be adapted to incorporate skid control means by the addition of a skid sensing unit, which can detect changes in the angular deceleration of the rear wheels or the transmission (e.g. at the propshaft), a control module which amplifies the signal from the sensing unit and produces a power output proportional to the input signal, the power being employed to act in opposition to the hydraulic signal from the master cylinder which controls the delivery of pressure fluid to the servo-motor.

This invention also provides a new and improved form of booster control device, the said device comprising valve means controlling energization of the booster, means urging the valve means to a normal position in which the booster is de-energized, hydraulically actuated means responsive to an hydraulic signal pressure to urge the valve means to an operative position in which the booster is energized, and electromagnetic means to which, in use, the said power output is applied and operable to produce a force opposing the force applied by the hydraulically actuated means to the valve means.

Some constructional forms of braking system in accordance with the invention will now be described, by way of example only, with reference to the accompanying drawings, in which.

Figure 1:
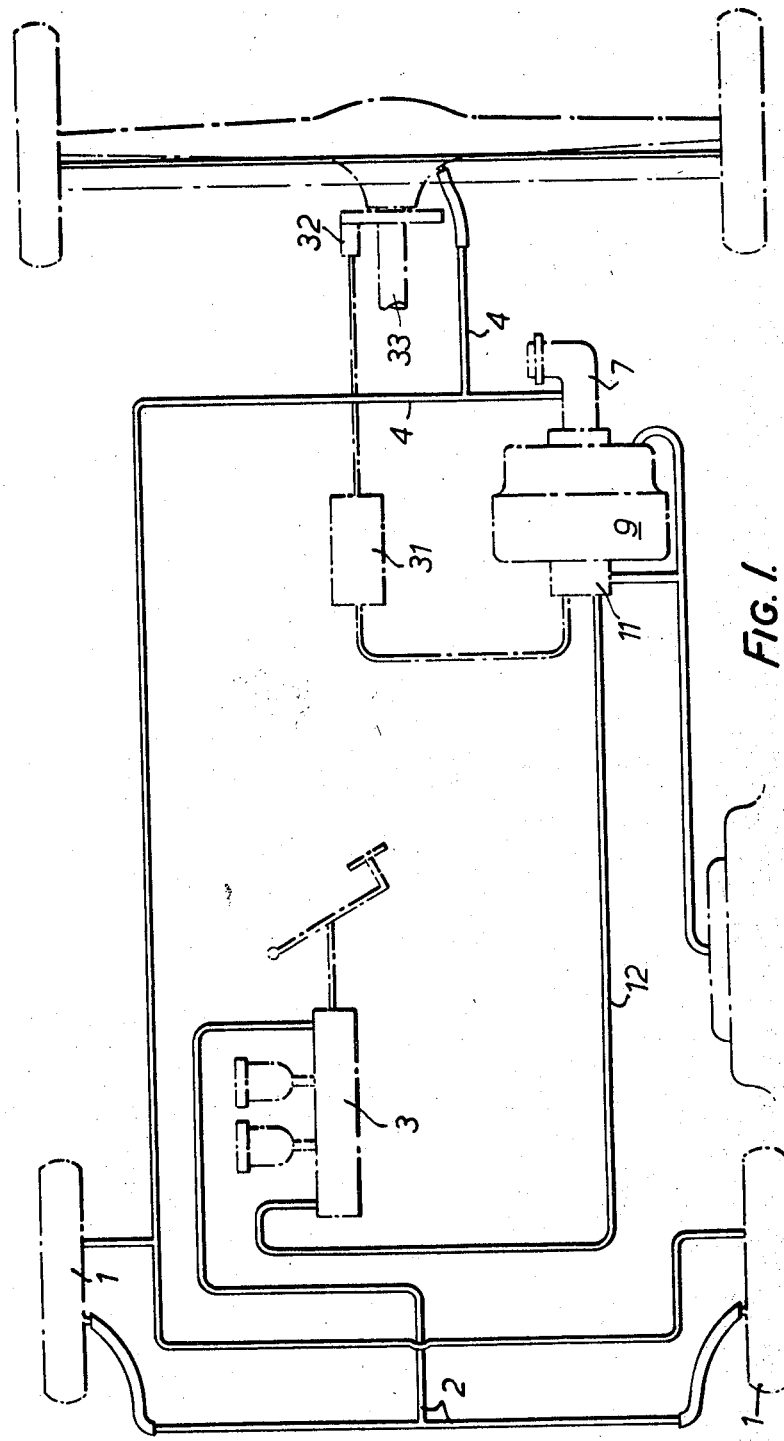
FIG. 1 is a schematic drawing of a complete system.

In the system shown in FIG. 1, each front brake 1 has at least two separate, opposed slave cylinders having separate pressure supplies thereto. One set is connected by a pressure line 2 directly to one pressure generating space of a driver operated tandem master cylinder 3, and the other set is connected directly to the pressure line 4 for the rear brakes 6.

Pressure for the rear brakes is generated in an auxiliary cylinder 7 operated by the push rod 8 of a servo-motor 9 subject to the operation of a control device 11, described in detail below, and connected hydraulically, by a line 12, to the other pressure generating space of the master cylinder 3. Thus, actuation of the master cylinder 3 normally pressurises the line 2 and front slave cylinders connected thereto, and line 12 to operate the servo-motor, whereupon the auxiliary cylinder 7 pressurises the pressure line 4, the rear brake slave cylinders and the remainder of the front brake cylinders.

The push rod 8 is coupled to a pressure responsive wall 13 which divides the housing of the servo-motor into two compartments, the rear compartment 9A being connected at all times to a source of vacuum (such as the inlet manifold of the engine). Pressure in front compartment 9B is controlled by valve gear which normally connects it to vacuum but admits atmospheric air in response to a signal from the master cylinder 3 to establish a pressure differential across the wall 13 thus advancing the push rod 8 and the piston of the auxiliary cylinder 7 to generate hydraulic pressure in the line 4.

More particularly, the valve gear comprises a casing 16, which is bolted to the motor housing, and a pair of concentric valve sets. One valve set comprises an air valve consisting of a hollow valve member 17 having a peripheral flange 18 which cooperates with a fixed valve seat 19. The second vacuum valve set comprises a valve member 21 cooperating with a seat constituted by the forward end of the valve member 17. Both valves are spring biassed to the left. The space to the left of the valve set is permanently connected to vacuum, and the space between to atmosphere by way of a duct 22. Normally (in the brakes off condition) the valve member 21 is unseated so that the wall 13 is vacuum suspended, being urged forwardly by a return spring 23.

The valve member 21 is fast with the core 24 of a solenoid 26. A spring lever 27 is pinned at one end to the core 24 and its other end acts as a pivot. A rigid lever 28 abuts an intermediate position of the resilient lever 27 and rocks about its other end. At a position adjacent the last said end, the lever 28 is acted upon by a slidable plunger 29 which is hydraulically connected to the tandem master cylinder by the line 12.

At the point where rigid lever 28 abuts the resilient lever 27 there is a fixed stop 30 in a position to prevent the force from the plunger 29, acting through the lever 28, exceeding a predetermined value.

The solenoid is electrically connected to a speed-detecting circuit and is energised by current from a control module 31, which is related to the rate of change of speed of the wheels as sensed by an electronic sensing means 32, coupled to prop shaft 33 of the vehicle.

Figure 2:
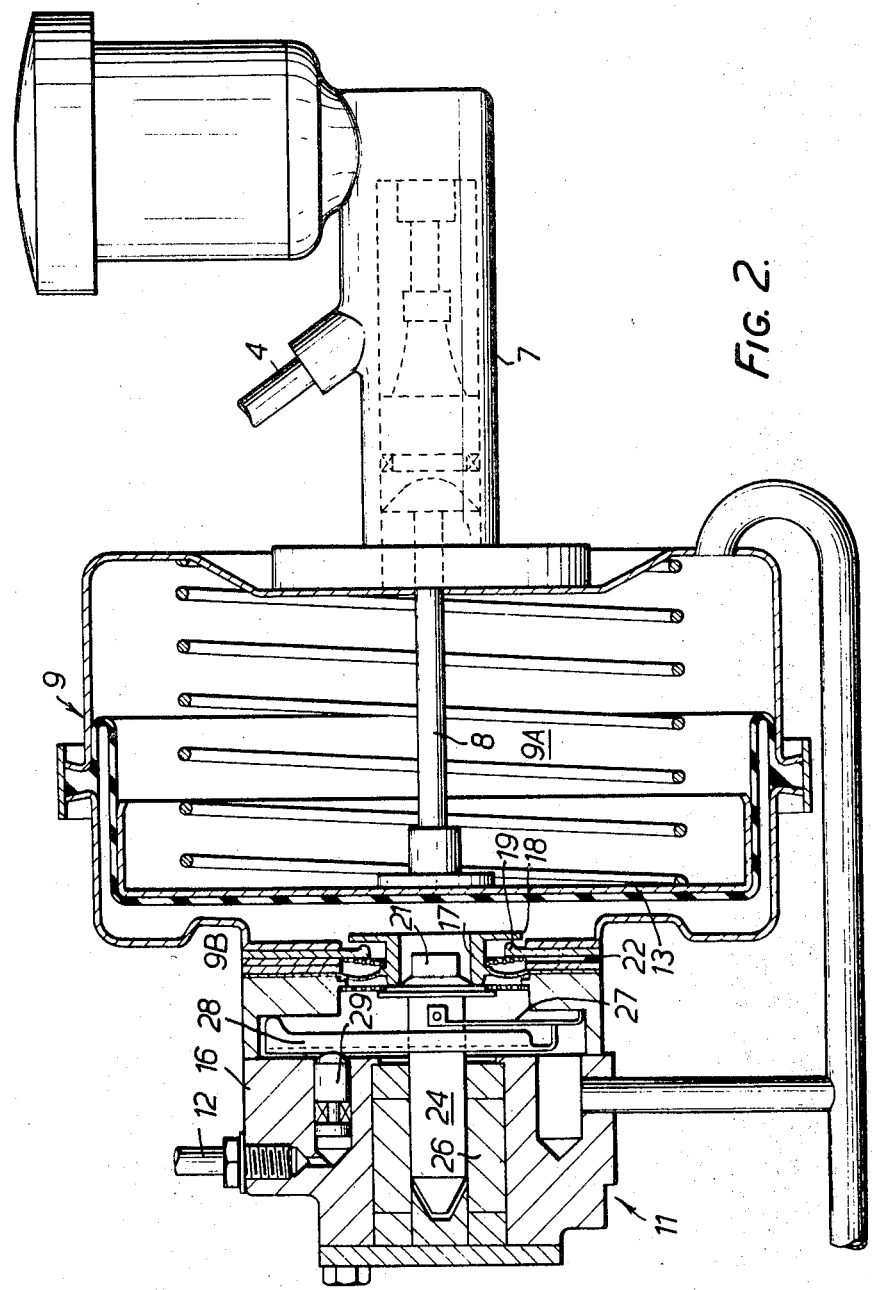
FIG. 2 is a part sectional elevation of one form of the servo-motor and control device of the system.

In normal braking, pressure generated in the line 12 acts on the plunger 29 to urge the lower end of the lever 28 rearwardly (to the right-hand FIG. 2) thus acting through the spring lever 27 to urge the core 24 rearwardly to close the vacuum valve 21. This position is shown in FIG. 2. Further rearward movement of the core and valve 21 unseats the air valve 17 to admit air into the forward motor compartment 9b. This moves the wall 13 and piston rod 8 rearwardly to pressurize the auxiliary cylinder 7 and pressure line 4. The air pressure in chamber 9b is now acting on the valve member 21, against the pressure urging the core 24 forwardly and against the pressure in the outer chamber 9a, so that the reaction force is a fixed proportion of the force on the wall 13. The pressure generated in the hydraulic cylinder 7 by the piston rod 8 is thus substantially in proportion to the force on the valve member 21. The hydraulic pressure from the master cylinder 7 operates the braking equipment of the vehicle to produce a deceleration which is measured by the sensing means 32 of FIG. 1, so that the control module provides deceleration feedback signal to the solenoid 26 and an opening effect on the valve 21 is produced by the solenoid as the solenoid plunger 24 urges the valve member 21 forwardly, aided by the force produced by the air pressure.

When these loads on the valve member 21, due to the air pressure and the solenoid force, balance the load on the plunger from the lever member 27, the air valve closes and similarly a reduction in the load on the plunger reopens the vacuum valve to allow relief of the air pressure in the motor compartment and reduce rear wheel braking. It follows that the rear brake pressure is controlled both by the hydraulic pressure from the master cylinder and by the deceleration of the rear wheels. The proportion of force on the valve 21 arising from the solenoid and from the input pressure is preferably chosen such that the deceleration is substantially controlled by the feedback from the deceleration sensor at all times. In this way the tendency of skid is being measured during all braking conditions and the braking force is reduced at any time when the deceleration of the wheels exceeds that chosen by the driver, since this will be due to the existence of excessive slip.

The important advantage of the above system in which a set of front wheel cylinders is connected into the rear line is that the occurrence of a reduction in the rear line pressure necessary to prevent skidding of the rear wheels is transmitted in part to the front wheels. The tendency of the front wheels to skid on a low friction surface is thereby reduced so there will be occasions when the control of rear wheel skidding also prevents the front wheels from skidding. We believe that front brake cylinders should be split so that between 50 and 75% of the braking is achieved by the cylinders which are directly connected to the master cylinder so that in event of complete failure of the rear system it is still possible to achieve satisfactory emergency braking on the front brakes.

For normal braking, i.e. when the solenoid is not energised, braking pressure is preferably apportioned between the front and rear brakes in which a manner that the rear wheels are always more likely to skid than the front wheels. For example, if the theoretical ideal ratio of front wheel braking pressure to rear wheel braking pressure is 60:40, we may deliberately alter this ratio to 50:50, to ensure the vehicle coming under the control of the skid sensing means before there is any real danger of the front wheels locking.

Figure 3:
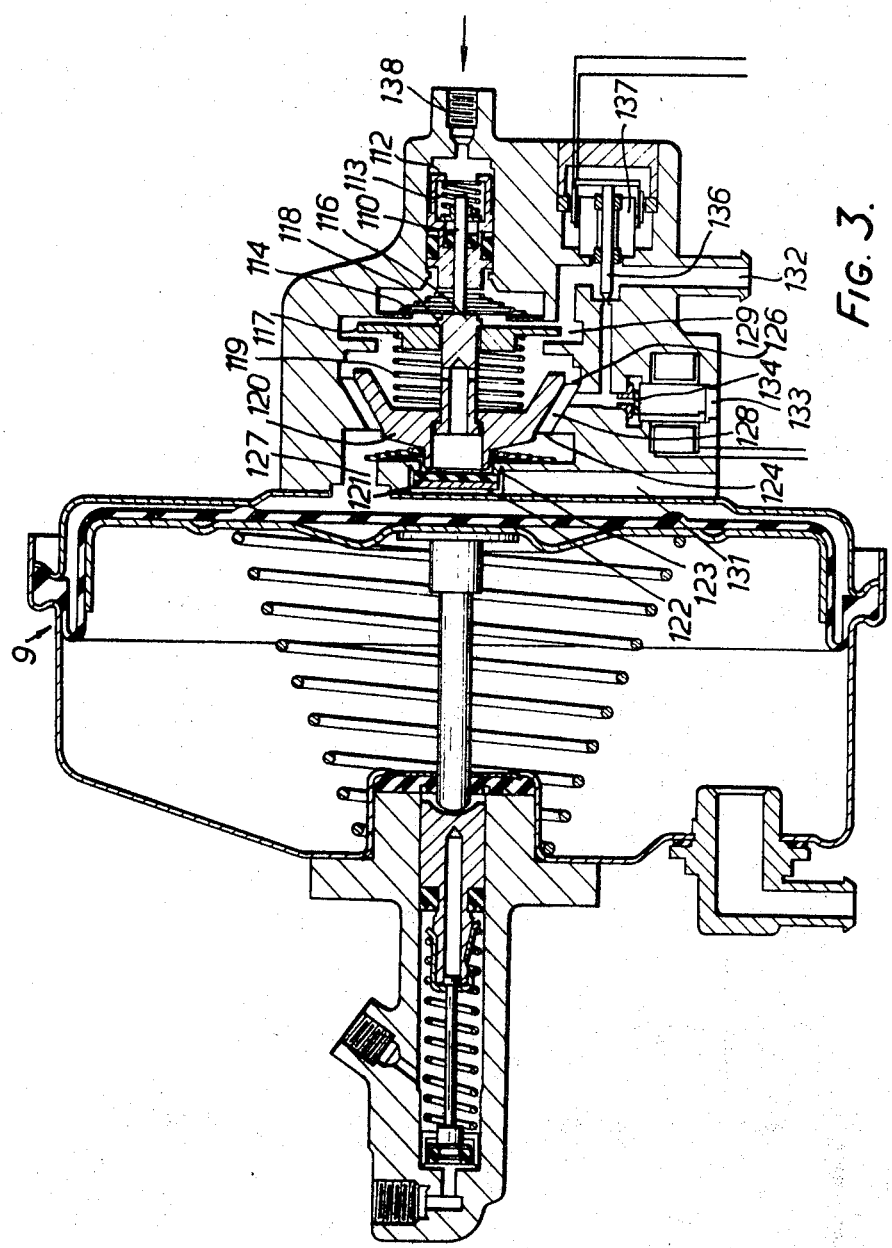
FIG. 3 is a part sectional elevation of a second form of servo-motor and control device.

A second form of booster control device is shown in FIG. 3, the booster motor itself being the same as in FIG. 2. This control device includes an hydraulic pressure responsive two stage piston assembly consisting of an inner piston 110 and an outer piston 112, with a coil compression spring 113 acting between the two pistons. A piston spring 114 urges piston assembly forwardly (to the right in FIG. 3). The inner piston terminates close to a valve stem 116 on which is mounted a loose abutment collar 117 held against a shoulder 118 by a spring 119, the rearward, left-hand end of which abuts a movable tubular control member 120 having an internal flange normally engaged with an external flange on the stem 116. The rear end of the member 120 is formed as a tubular extension constituting a valve seat 121 for valve plate 122, the seat 121 and plate 122 forming a vacuum valve. The outer margin of the valve plate 122 cooperates with a fixed valve seat 123 to form an air valve.

The control member 120 is sealed to the wall of the control gear housing by flexible, but substantially inextensible diaphragms 124 and 126, which divide the interior of the housing into separate chambers 127, 128 and 129. It will be noted that the diaphragm 124 is of smaller area than diaphragm 126. The housing has a main air inlet port 131, for air at atmospheric pressure, a vacuum port 132 through which air is extracted from chamber 129 and a second air inlet port 133 which is connected, in use, to chamber 128 by opening a normally closed solenoid valve 134. This chamber is normally connected to chamber 129 through a needle valve 136 controlled by a solenoid moving coil 137. Finally, the housing has an hydraulic pressure inlet port 138 connected in use to the line 12 of FIG. 1.

The valve controlling solenoids 134 and 137 may both be connected to the control modules or the solenoid 134 may be connected into the stop light circuit to be energised as soon as brake application commences.

In use, before the brakes are actuated, the air valve set 122, 123 is closed and the vacuum valve set 121, 122 opened, thus connecting the forward chamber of the booster motor to the vacuum supply, so that the booster is vacuum suspended.

For actuation of the brakes, the master cylinder is manually operated, and supplies pressure to the inlet port 138, urging the pistons 110 and 112 rearwardly against the action of return spring 114. Almost immediately the clearances between the piston 110 and stem 116 and between members 121 and 122 are taken up, whereafter the piston 112 moves, relative to the inner piston 110, compressing the spring 113, until the outer piston 112 encounters a stop in its path. At this stage, the vacuum valve has been closed, and the forces on control member 120 and the valve plate are substantially in balance, so that a small additional force will be sufficient to open the air valve set 122, 123. Any further increase in inlet pressure acts on the close-sectional area of the inner piston 110, urging the inner piston 110, the stem 116 and the control member 120 further rearwardly to unseat the valve plate 122 from the air valve seat 123. Air is thereby admitted to the booster motor, which operates as before to generate pressure for applying the vehicle brakes. Thus, to summarise the operation of the two stage pistons 110 and 112, both pistons are initially moved in unison, in response to an initial signal pressure, to take up clearances; the outer piston then moves relative to the inner piston, loading the spring 113, until the outer piston encounters a stop, whereupon any further increase in signal pressure acts on the inner piston alone to operate the air valve and energize the booster.

It will be seen that the opening force applied to the control member 120 of air valve set is limited to that transmitted through the spring 119. Upon opening of the air valve, this force is opposed by the air pressure acting over the full area defined within the outside diameter of the diaphragm 124, thus providing a reaction to rearward movement of the inner piston 110. This reaction is augmented by the fact that the chamber 129 is normally at full vacuum (i.e. minimum pressure). Assuming that the air solenoid valve 134 is operated by signals from the control module, the valve 134 will remain closed until a predetermined deceleration is sensed, whereupon the valve will open to admit air to the chamber 128.

The signal caused by excessive deceleration also causes the vacuum solenoid valve 137, 136 to move towards the closed position, and in the extreme case, when the wheels are locked or about to lock, the valve 136 is fully closed. With valve 134 open and valve 137 fully closed, an additional force is applied to member 120, tending to move the member forwardly and thereby reduce the braking effort. This additional force, which may be termed a deceleration feedback force, is limited to the product of the pressure difference between chambers 128, 129 and the difference in areas of the two diaphragms 124 and 126.

In any intermediate case, the valve 136 is only partially closed, to throttle the flow of air past the valve 136, so that a pressure difference is established between chambers 128 and 129. Even in its fully open (illustrated) position the valve 136 exerts a throttling effect.

If, as mentioned above, the air solenoid valve 134 is connected in the stop-light circuit, or otherwise arranged to open as soon as the brakes are applied, the pressure difference between chambers 128 and 129 will be entirely dependent upon the throttling effect of valve 136.

In some cases, the air solenoid valve 134 may be completely omitted and the chamber 128 permanently connected to atmosphere through a suitable orifice, provided extraneous conditions are such that grit and dirt are not drawn into the vacuum system through chamber 128.

The control gear in this second embodiment requires a greater volume of hydraulic fluid for its actuation than that of the first embodiment, and so it is used with a tandem master cylinder whose split ratio is not greater than 9:1.

In both of the above described forms of the invention, the control module may, as previously stated, produce a power output proportional to the input signal derived from the sensing unit. Alternatively, however, the sensing unit and module may be constructed and arranged not to initiate a power output until a predetermined minimum deceleration is sensed. Once the deceleration reaches this predetermined value, the power output may be constant or may be proportional to the deceleration.

Many variations and modifications of the system first described above will, of course, be possible within the scope of the present invention. In some cases, for example, we may replace the tandem master cylinder with a single master cylinder, and employ non-hydraulic means to generate a signal for controlling the servo-motor. For example, we may use a load cell associated with the master cylinder for generating an electrical signal to operate the servo-motor, or a purely mechanical arrangement. With these arrangements, we can still obtain the advantages of the system described above, including the possibility of providing servo-assistance for both rear and front wheel braking from a single servo-motor which can be positioned remote from the bulkhead.

The above described control devices are, of course, completely self-contained, so that each can be fitted as a unit to a booster motor. The necessary hydraulic, pneumatic and electrical supply connections are readily made in known manner. This is in contrast to known arrangements in which the pneumatic valves are separated from the electrical and hydraulic control means which operate them. In other words a complete system incorporating the present control device basically comprises: a control device; electrical means producing a signal representing deceleration; and driver operated means (such as a master cylinder) producing a command signal representing the braking effort called for by the driver. The deceleration signal and command signal are directly applied to the control device.

In the known systems referred to above, the system further includes a means for comparing the command and deceleration signals and producing a difference signal applied to the control device. Thus, the comparison means is built, supplied and installed as a further unit, adding considerably to the overall expense of the system.

I claim:

1. In an hydraulic braking system, the combination of a manually actuated tandem master cylinder having two pressure chambers; a first group of front wheel slave cylinders hydraulically connected to a first of said pressure chambers; a servo-motor with auxiliary pressure cylinder; a control device for controlling operation of said servo-motor; a group of rear wheel slave cylinders and a second group of front wheel slave cylinders operatively connected to said auxiliary cylinders; and means responsive to pressure in the second of said pressure chambers to effect operation of said control device.

2. An hydraulic braking system in accordance with claim 1, further comprising a skid sensing unit for detecting a predetermined minimum angular deceleration of the rear wheels of a vehicle; a control module arranged to amplify a signal from the sensing unit to produce a power output which is caused to act in opposition to an hydraulic pressure signal from said second pressure chamber.

3. In or for an hydraulic braking system in accordance with claim 2, wherein said servo-motor is a vacuum operated booster, a control device comprising valve means controlling energization of said booster, means urging said valve means to a normal position in which said booster is de-energized, hydraulically actuated means responsive to an hydraulic signal pressure to urge said valve means to an operative position in which said booster is energized, and electro-magnetic means to which, in use, the said power output is applied and operable to produce a force opposing the force applied by said hydraulically actuated means to said valve means.

4. A booster control device in accordance with claim 3, wherein said valve means comprises a movable valve member subject to the action on the one hand of the said hydraulically actuated means and on the other hand of a solenoid constituting the said electro-magnetic means.

5. A booster control device in accordance with claim 3, wherein said valve means includes a movable control member which is moved in one direction to energize said booster and in the opposite direction to de-energize it, the said member being urged in operation in the said one direction in response to an hydraulic pressure signal generated in said master cylinder and in the opposite direction by the action of a differential pressure generated in response to operation of said electro-magnetic means.

6. A booster control device in accordance with claim 5, wherein said movable member is sealed around its periphery by a diaphragm having separate pressure chambers on either side thereof, and an electromagnetically operated valve which is actuated by the said power output to reduce the degree of communication between said chambers and thereby increase the difference in pressure between the said pressure chambers.

7. A booster control device in accordance with claim 6, including a second diaphragm of smaller effective area sealed to the periphery of said movable member, the said diaphragms defining one of the said pressure chambers therebetween, both chambers normally being subjected to vacuum, and air inlet valve means which is normally closed, but operable upon brake actuation to admit air to the chamber defined by said diaphragms, which, coupled with actuation of said electromagnetically operated valve, creates a pressure difference between said chambers, which pressure difference is effective over the difference in area of the said diaphragms.

8. A booster control device in accordance with claim 5, wherein said hydraulic pressure signal is transmitted to said movable member by a two stage piston assembly, of which both pistons are initially movable in unison in response to an initial signal pressure, one piston encountering a stop after an initial movement, whereupon the second piston is movable relative to the first piston to transmit forces at a reduced rate to the movable member and effect operation of the said valve means.

References Cited

UNITED STATES PATENTS

| | | | |
|---|---|---|---|
| 2,764,262 | 9/1956 | Stelzer | 60—54.5 X |
| 2,883,830 | 4/1959 | Stelzer | 60—54.5 |
| 3,325,226 | 6/1967 | Perrino | 303—21 |
| 3,401,986 | 9/1968 | Walker et al. | 303—21 |
| 3,415,577 | 12/1968 | Walker | 303—21 |

MILTON BUCHLER, Primary Examiner

J. J. McLAUGHLIN, Jr., Assistant Examiner

U.S. Cl. X.R.

60—54.5; 188—152, 181; 303—6